United States Patent
Jin et al.

(10) Patent No.: US 11,273,388 B2
(45) Date of Patent: Mar. 15, 2022

(54) TECHNIQUE AND APPARATUS FOR RECYCLING VOLATILE ORGANIC COMPOUNDS OF COATING PRINTING

(71) Applicant: JIANGSU JIUMO HIGH-TECH CO., LTD., Nanjing (CN)

(72) Inventors: Wanqin Jin, Nanjing (CN); Mingming Cao, Nanjing (CN); Xiaobin Ding, Nanjing (CN); Weihong Xing, Nanjing (CN)

(73) Assignee: JIANGSU JIUMO HIGH-TECH CO., LTD., Nanjing (CN)

( * ) Notice: Subject to any disclaimer, the term of this patent is extended or adjusted under 35 U.S.C. 154(b) by 0 days.

(21) Appl. No.: 14/765,343

(22) PCT Filed: May 8, 2014

(86) PCT No.: PCT/CN2014/077054
§ 371 (c)(1),
(2) Date: Aug. 2, 2015

(87) PCT Pub. No.: WO2014/187242
PCT Pub. Date: Nov. 27, 2014

(65) Prior Publication Data
US 2016/0136540 A1    May 19, 2016

(30) Foreign Application Priority Data
May 21, 2013    (CN) .......................... 201310192782.9

(51) Int. Cl.
*B01D 5/00*    (2006.01)
*B01D 53/00*    (2006.01)
(Continued)

(52) U.S. Cl.
CPC ........... *B01D 5/0093* (2013.01); *B01D 5/006* (2013.01); *B01D 5/009* (2013.01); *B01D 53/002* (2013.01);
(Continued)

(58) Field of Classification Search
CPC ...... B01D 5/006; B01D 5/009; B01D 5/0093; B01D 53/002; B01D 53/22; B01D 53/229;
(Continued)

(56) References Cited

U.S. PATENT DOCUMENTS 4,662,899 A * 5/1987 Tandon ................ B01D 53/002
165/909
4,683,029 A * 7/1987 Oyler ................. B01D 11/0269
196/14.52
(Continued)

FOREIGN PATENT DOCUMENTS

CN    1425486 A    6/2003
CN    201692748 U  * 1/2011 ............. B01D 53/22
(Continued)

OTHER PUBLICATIONS

English language machine translation for CN 201692748 U. Retrieved from http://translationportal.epo.org on Dec. 5, 2016.*
(Continued)

*Primary Examiner* — Jason M Greene
(74) *Attorney, Agent, or Firm* — Proi Intellectual Property US

(57) ABSTRACT

The present invention discloses an integrated new technique and apparatus for recycling volatile organic compounds of coating printing. The new technique collects a mixed gas of volatile organic compounds produced in the process of coating and drying of a coating machine with a volatiles collecting hood of coating machine, compresses and lead the (Continued)

mixed gas of volatile organic compounds into a condensation system for condensation; the obtained condensate enters a gas-liquid separator to obtain a coating solvent with high concentration; non-condensable lean gas enters a membrane separation and enrichment system to obtain a mixed gas of high concentration organic compounds after membrane separation and enrichment with a complete set of membrane assembly, and then returns to front of the condensation system to repeat the integrated technique. The separation membrane as claimed in the present invention has an extremely high permselectivity for volatile organic compounds of coating printing and can quickly enrich the volatile organic compounds. Recycling rate of volatile organic compounds of the apparatus may reach 90%, and the content of organic compounds in the tail gas emission after treatment is no more than 1 $g/m^3$. This integrated new technique largely reduces the production cost of coating printing industry and at the same time protects the atmospheric environment.

4 Claims, 1 Drawing Sheet

(51) Int. Cl.
*B01D 53/22* (2006.01)
*B05B 14/49* (2018.01)
*B05B 16/60* (2018.01)

(52) U.S. Cl.
CPC ...... *B01D 53/229* (2013.01); *B01D 2053/221* (2013.01); *B01D 2257/70* (2013.01); *B01D 2258/06* (2013.01); *B05B 14/49* (2018.02); *B05B 16/60* (2018.02)

(58) Field of Classification Search
CPC .......... B01D 2053/221; B01D 2257/70; B01D 2258/06; F25J 3/08
See application file for complete search history.

(56) References Cited

U.S. PATENT DOCUMENTS

| | | | | |
|---|---|---|---|---|
| 5,089,033 A | * | 2/1992 | Wijmans | B01D 53/22 95/39 |
| 5,205,843 A | * | 4/1993 | Kaschemekat | B01D 53/22 95/39 |
| 5,542,965 A | * | 8/1996 | Straubinger | B01D 53/0454 95/115 |
| 5,779,763 A | * | 7/1998 | Pinnau | B01D 53/002 95/39 |
| 5,861,049 A | * | 1/1999 | Lokhandwala | B01D 53/229 95/149 |
| 5,960,789 A | * | 10/1999 | Fleming | F24B 1/1808 126/512 |
| 5,989,312 A | * | 11/1999 | Barnhard | B01D 53/22 95/10 |
| 2014/0033918 A1 | * | 2/2014 | Zheng | B01D 53/228 95/51 |
| 2016/0010269 A1 | * | 1/2016 | Testa | D06F 43/081 8/142 |

FOREIGN PATENT DOCUMENTS

| | | | | |
|---|---|---|---|---|
| CN | 202010505 U | * | 10/2011 | B01D 53/22 |
| CN | 202516462 U | | 11/2012 | |
| CN | 202605765 U | | 12/2012 | |
| CN | 103277982 A | | 9/2013 | |
| JP | 7-47222 | * | 2/1995 | B01D 53/22 |
| JP | H0747222 A | | 2/1995 | |

OTHER PUBLICATIONS

English language machine translation for JP 7-47222. Retrieved from http://translationportal.epo.org on Dec. 5, 2016.*
English language machine translation for CN 202010505 U. Retrieved from http://translationportal.epo.org on Dec. 5, 2016.*

* cited by examiner

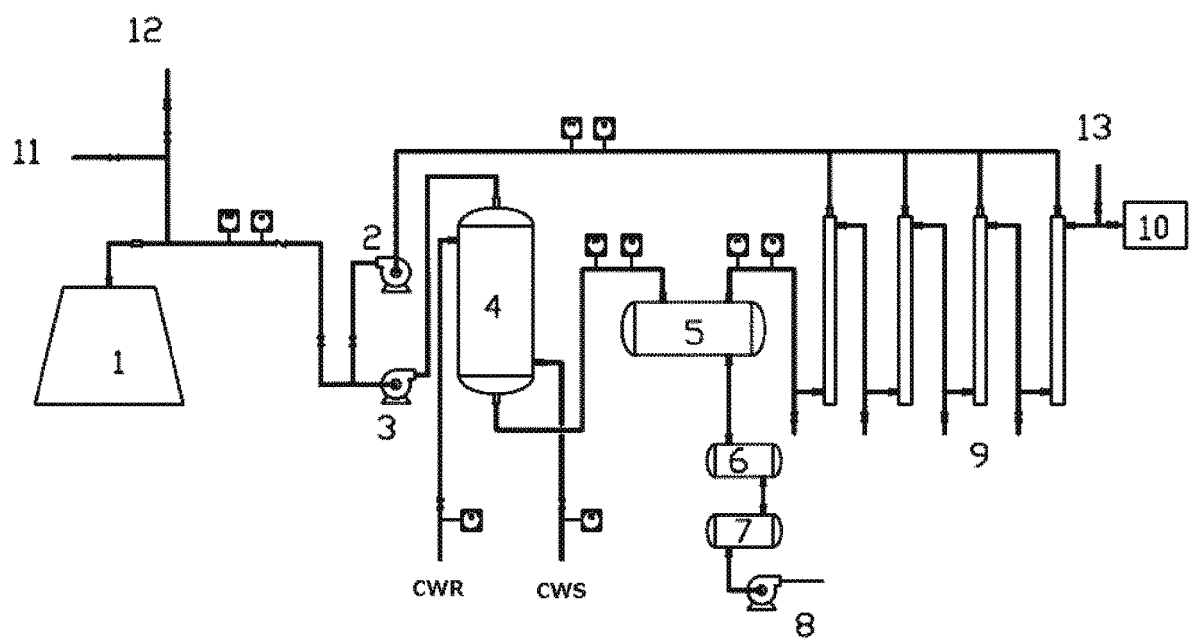

TECHNIQUE AND APPARATUS FOR RECYCLING VOLATILE ORGANIC COMPOUNDS OF COATING PRINTING

CROSS-REFERENCE TO RELATED APPLICATIONS

This application claims priority from CN Application No. 201310192782.9, filed May 21, 2013 and PCT Application No. PCT/CN2014/077054, filed May 8, 2014, the contents of which are incorporated herein in the entirety by reference.

FIELD OF THE INVENTION

The present invention relates to a technology for recycling volatile organic compounds of coating printing, and in particular, to a technique and apparatus for recycling volatile organic compounds of coating printing with an integration of cascade refrigeration and organic permselective membrane.

BACKGROUND OF THE INVENTION

A large amount of organic compounds will be volatilized in the process of coating printing, such as hydrocarbons, alcohols, esters, ethers and nitriles, this is because the coating printing must use high-concentration organic solvents for coating. Taking a coating machine as an example, the consumption of organic solvents is 10 g/m$^2$; supposing coating printing of 100 m (length)×0.8 m (width) is completed per minute, totally 48 kg organic solvents will be consumed per hour. Detection result shows that its volatilization reaches 85%, and the rate of organic compounds in the volatiles is 40 kg/h. The discharge of the organic compounds will not only result in wasting of resources, but also lead to serious environmental problems. At present, few manufacturers in the coated printing industry recycle the organic compounds, while some manufacturers recycle or process the organic compounds by means of burning, active carbon absorption, condensation and etc., but these means are difficult to realize recycling or will face a high energy consumption and cost even if recycling is possible.

In the current market of coating printing packaging in China, every year the domestic sales of printing coating machineries is about RMB 18 billion to 20 billion, with an average annual growth rate of over 15% and approximately a half from import. Taking Guangdong Province as an example, it is not only a major province of packaging industry but also a major province of coating printing packaging, taking a leading position in both the number of enterprises and industrial outputs in domestic. Therefore, due to problems of high energy consumption and high pollution in package print coating industry, energysaving and emission reduction is an inevitable trend of enterprises in package print coating industry. According to statistics from Printing Industry Association of Guangdong Province, up to 2007, there are nearly 18000 printing enterprises in Guangdong, with a total output over RMB 50 billion, accounting for over 33% of the whole country. It is roughly estimated that printing enterprises in Guangdong discharge more than 4 million tons volatile organic compounds to atmosphere every year, worth RMB 24 billion in terms of an average market price of RMB 6000/ton. If 80% of the volatile organic compounds discharged to atmosphere can be recycled every year, it not only brings ecological benefits in significant reduction of air pollution, improvement of air quality and protection of environment but also brings nearly RMB 20 billion economic benefits, which may be expanded to RMB 100 billion considering the whole country.

SUMMARY OF THE INVENTION

The first purpose of the present invention is to provide a technique for recycling volatile organic compounds from coating printing, which adopts integration of condensation technology and membrane separation technology to realize recycling of volatile organic compounds in the production process of coating printing packaging. The technique not only solves the problem of difficult to reach low temperature by condensation but also overcome shortcomings of low efficiency in separation of partial membrane.

In order to accomplish the purpose, the present intension adopts the following technical scheme:

A technique for recycling volatile organic compounds of coating printing, including the following steps:

(1) Collect a mixed gas of volatile organic compounds produced in the printing process of a coating machine with a volatiles collecting hood of the coating machine, compress and lead the volatiles into a condensation system for condensation;

(2) Lead the condensate obtained in the above step into a gas-liquid separator to obtain a coating solvent with high concentration after an enrichment process; lead non-condensable gas into a membrane separation and enrichment system, obtain a mixed gas of organic compounds after membrane separation and enrichment with a complete set of membrane assembly, and then lead it back to the compressor for recycling.

In Step 1 of the technique in the present invention, lead the mixed gas of volatile organic compounds into the condensation system, make precooling at 0° C., and then make condensation to −30~−50° C., to complete condensation of part of the volatile organic compounds.

In Step 2 of the technique in the present invention, after measurement, the coating solvent with high concentration enters a solvent preparation area of the next workshop section or an appointed workshop section for recycling.

In Step 2 of the technique in the present invention, a complete set of membrane assembly is adopted for the membrane separation, and the structures of the complete set of membrane assembly include tubular type, coiled type, flat-sheet type, hollow-fiber type and etc.

The tubular type membrane assembly in the present invention is made of stainless steel 202; the inner part of the assembly is of a shell-and-tube structure with a deflection baffle in the middle; gas inlet, permeate outlet and retentate outlet are provided outside; the assembly may contain 200 tubular organic permselective membranes (the number of tubular membranes may vary, and the assembly is designed according to gas flow). The specific structure of the tubular type membrane assembly is determined by technicians in this field, while the present invention does not state any special restriction.

The coiled type membrane assembly in the present invention is mainly made of flat-sheet organic permselective membrane through coiling; the coiled type membrane assembly comprises a flat-sheet membrane, a feeding mesh, a gas-permeable mesh, a glue and dialysate collecting tube and etc. Multiple membrane assemblies may be connected in series or in parallel in case of a high gas flow of volatile organic compounds. The specific structure of coiled type membrane assembly is determined by technicians in this field, while the present invention does not state any special restriction.

The organic permselective membrane in the present invention includes PDMS composite membrane, organic compound membrane, molecular sieve membrane, mixed matrix membrane adulterated with inorganic substances and etc., wherein, the PDMS composite membrane is an organophilic composite membrane where modified polydimethyl siloxane is coated on and crosslinked with an inorganic ceramic tubular membrane or a PVDF matrix membrane. The organic permselective membrane in the present invention is preferable PDMS tubular membrane.

The absolute pressure of the vacuum pump on the permeation side in operation of the complete set of membrane assembly for the apparatus in the present invention is 10-40 kPa, and 25-35 kPa is preferred.

The mixed gas of volatile organic compounds in the present invention includes but not limited to hydrocarbons, alcohols, esters, ethers and nitriles, e.g., butanone, ethyl acetate, n-propyl acetate, methyl ether and etc.

The present invention is relates to an application of combination of new-type condensation technology and advanced membrane technology in the coating industry, in which the combination of condensation to −30-50° C. and membrane technology may realize recycling of volatilized organic gases. The technique is divided into two parts; one is the condensation technique consisting of a compressor, a condenser and a separator; the other is the membrane separation technique consisting of a separating membrane and a vacuum pump. Most of the volatile organic constituents from the coating machine are condensed by a cryogenic medium in the condenser, and the organic solvent is recycled in the separator and sent back to the solvent preparation area. The saturated organic compounds/air mixtures flowing out from the tower top of the separator enter a membrane separator for further recycle of the organic compounds contained. Two flows are generated after flowing through the membrane separator; one is the flow of permeate gas enriched with oil gas, which is recycled before returning to the compressor to keep the organic compounds before entering membrane below the explosion limit; the other is the flow of purified air, which may be discharged when a small amount of organic compounds is contained.

The present invention takes the mixed gas of volatile organic compounds produced in the coating printing process as the raw materials, including but not limited to hydrocarbons, alcohols, esters, ethers and nitriles, e.g., butanone for 31.6 wt %, ethyl acetate for 31.7 wt %, n-propyl acetate for 31.7 wt % and methyl ether for 5 wt %.

The technique in the present invention is suitable for various mixed gas containing volatile organic compounds. The volatilization amount of organic compounds of the mixed gas is 20-60 kg/h, and 40 kg/h is preferred (which means 40 kg organic compounds are volatilized per hour). The volatile organic compounds are driven out by a blower with an outlet gas flow of 5000 m$^3$/h (which is not limited), and then enter the "condensation+membrane" apparatus in the present invention through the volatiles collecting hood of coating machine for recycling. According to experiments and on-line chromatographic analysis, recycling rate of the technique in the present invention may reach 90%, and the content of organic compounds in tail gas emission is no more than 1 g/m$^3$.

The second purpose of the present invention is to provide an apparatus for recycling volatile organic compounds of coating printing. The apparatus consists of a volatiles collecting hood of coating machine, a compressor, a condenser and a gas-liquid separator connected and positioned successively; the bottom of the gas-liquid separator is connected to a liquid storage device, and the top of the gas-liquid separator is connected to a complete set of membrane assembly.

For the apparatus in the present invention, the complete set of membrane assembly comprises organic permselective membranes, and its structures include tubular type, coiled type, flat-sheet type, hollow-fiber type and etc.

The tubular type membrane assembly in the present invention is made of stainless steel 202; the inner part of the assembly is of a shell-and-tube structure with a deflection baffle in the middle; gas inlet, permeate outlet and retentate outlet are provided outside; the assembly may contain 200 tubular organic permselective membranes (the number of tubular membrane may vary, and the assembly is designed according to gas flow). The specific structure of the tubular type membrane assembly is determined by technicians in this field, while the present invention does not state any special restriction.

The coiled type membrane assembly in the present invention is mainly made of flat-sheet organic permselective membrane through coiling; the coiled type membrane assembly comprises a flat-sheet membrane, a feeding mesh, a gas-permeable mesh, a glue and dialysate collecting tube and etc. Multiple membrane assemblies may be connected in series or in parallel in case of a high gas flow of volatile organic compounds. The specific structure of coiled type membrane assembly is determined by technicians in this field, while the present invention does not state any special restriction.

The organic permselective membrane in the present invention includes PDMS composite membrane, organic compound membrane, molecular sieve membrane, mixed matrix membrane adulterated with inorganic substances and etc., wherein, the PDMS composite membrane is an organophilic composite membrane where modified polydimethyl siloxane is coated on and crosslinked with an inorganic ceramic tubular membrane or a PVDF matrix membrane. The organic permselective membrane in the present invention is preferable PDMS tubular membrane.

Further, a gas inlet detector and an emergency vent for detecting gas and discharged gas in emergency respectively are arranged between the volatiles collecting hood of coating machine and the compressor.

Further, the liquid storage device consists of a buffer tank and a collecting tank connected successively. The collecting tank may be further connected to a liquid pump.

Further, the complete set of membrane assembly is provided with a tail gas sampling outlet, a tail gas detecting device and a tail gas vent.

Furthermore, a vacuum pump is arranged between the complete set of membrane assembly and the compressor in the present invention. The vacuum pump can pump the mixed gas of organic compounds enriched in the complete set of membrane to the compressor for recycling.

By adopting the above technical scheme, the present invention has the following benefits:

1. The present invention relates to the combination of condensation technology and advanced membrane technology to overcome problems of difficult to reach low temperature by condensation, reduce membrane separation loads, and increase recycling rate; besides, the apparatus occupies a small floor area with a low cost of operation.

2. The organic permselective membrane adopted by the present invention is highly selective for volatile organic compounds from the printing coating machine, enriching the volatile organic compounds from the printing coating machine and reducing the energy consumption in the condensation section.

3. The "condensation+membrane" technology adopted by the present invention is a physical process, favorable to recycling.

4. The coating printing industry volatilizes an extremely high amount of volatile organic compounds and the adoption of the present invention can efficiently clean the air.

BRIEF DESCRIPTION OF THE DRAWINGS

FIG. 1 is a schematic diagram of the apparatus for recycling volatile organic compounds of coating printing.

Wherein, 1. volatiles collecting hood of coating machine; 2. vacuum pump; 3. compressor; 4. condenser; 5. gas-liquid separator; 6. buffer tank; 7. collecting tank; 8. liquid pump; 9. complete set of membrane assembly; 10. tail gas sampling outlet; 11. gas inlet detector; 12. emergency vent; 13. tail gas vent.

DETAILED DESCRIPTION OF PARTICULAR EMBODIMENTS OF THE INVENTION

FIG. 1 indicates the apparatus for recycling volatile organic compounds of coating printing. The apparatus consists of a volatiles collecting hood of coating machine 1, a compressor 3, a condenser 4 and a gas-liquid separator 5 connected and positioned successively; the bottom of the gas-liquid separator 5 is connected to a liquid storage device, and the top of the gas-liquid separator 5 is connected to a complete set of membrane assembly 9.

The complete set of membrane assembly 9 adopts an organic permselective membrane. The organic permselective membrane in the present invention includes PDMS composite membrane, organic compound membrane, molecular sieve membrane, and mixed matrix membrane adulterated with inorganic substances, wherein, the PDMS composite membrane is an organophilic composite membrane where modified polydimethyl siloxane is coated on and crosslinked with an inorganic ceramic tubular membrane or a PVDF matrix membrane. The organic permselective membrane adopted by the present invention has an existing structure, against which the present invention does not state any restriction. Technicians in this field can select an organic permselective membrane that can efficiently realize corresponding functions to carry out the technical scheme of the present invention according to the actual production technique. Furthermore, a gas inlet detector 11 and an emergency vent 12 for detecting gas and discharged gas in emergency respectively are arranged between the volatiles collecting hood of coating machine 1 and the compressor 3. The liquid storage device consists of a buffer tank 6 and a collecting tank 7 connected successively. The collecting tank 7 may be further connected to a liquid pump 8.

Further, the complete set of membrane assembly 9 is provided with a tail gas sampling outlet 10, a tail gas detecting device 10 and a tail gas vent 13. A vacuum pump 2 is arranged between the complete set of membrane assembly 9 and the compressor 3. The vacuum pump 2 can pump the mixed gas of organic compounds enriched in the complete set of membrane to the compressor for recycling.

When the present apparatus operates, the volatiles collecting hood of coating machine 1 feeds organic compounds produced in the process of coating printing and air into the compressor 3 through a header, and then into a condensation system after pressurized by the compressor 3; the condenser 4 is used for cooling of the cold box to condense the volatile organic compounds with a high boiling point; then the gas-liquid separator 5 is used for collecting liquid organic compound solvent, which is led to the buffer tank 6 and finally to the collecting tank 7; when a large amount of organic compound solvent is collected, the liquid pump 8 is used for pumping it the preparation area; at the same time, the saturated organic compound gas with a low boiling point above the gas-liquid separator 5 enters the complete set of membrane assembly 9; then the complete set of membrane assembly 9 enriches the organic compound gas through the vacuum pump 2 on the downstream side; after enrichment, the organic compound gas is recycled again before entering the compressor 3; meanwhile, the concentration of organic compounds on the retentate side of the membrane reaches the standard for discharge.

The volatile organic compounds produced in the process of coating printing is taken as the raw material (butanone for 31.6 wt %, ethyl acetate for 31.7 wt %, n-propyl acetate for 31.7 wt % and methyl ether for 5 wt %). The volatilization amount of organic compound is 40 kg/h (which means 40 kg organic compounds are volatilized per hour). The volatile organic compounds are driven out by the blower with an outlet gas flow of 5,000 m³/h and then enter the "condensation+membrane" apparatus in the present invention for recycling through the volatiles collecting hood of coating machine.

Embodiment 1

Set the condensing temperature to be −30° C.; Adopt organic permselective membrane (PDMS tubular membrane); set the absolute pressure of the vacuum pump to be 10 kPa. The result of experiment is as below:

|  | Temperature ° C. | Pressure kPa | Butanone g/m³ | Ethyl acetate g/m³ | N-propyl acetate g/m³ | Methyl ether g/m³ | Air g/m³ |
| --- | --- | --- | --- | --- | --- | --- | --- |
| Gas inlet | 100 | Atmospheric pressure | 2.54 | 2.54 | 2.54 | 0.40 | 1160 |
| Condenser | −30 | Atmospheric pressure | 1.27 | 1.29 | 0.54 | 0.30 | 1200 |
| Permeate gas | 30 | 10 | 5.43 | 5.29 | 1.98 | 1.06 | 400 |
| Discharged gas | 30 | 120 | 0.23 | 0.29 | 0.18 | 0.11 | 1400 |

Set the condensing temperature to be −40° C.; Adopt organic permselective membrane (PDMS tubular membrane); set the absolute pressure of the vacuum pump to be 10 kPa. The result of experiment is as below:

|  | Temperature °C. | Pressure kPa | Butanone g/m³ | Ethyl acetate g/m³ | N-propyl acetate g/m³ | Methyl ether g/m³ | Air g/m³ |
|---|---|---|---|---|---|---|---|
| Gas inlet | 100 | Atmospheric pressure | 2.54 | 2.54 | 2.54 | 0.40 | 1160 |
| Condenser | −40 | Atmospheric pressure | 1.26 | 1.27 | 0.53 | 0.30 | 1182 |
| Permeate gas | 30 | 10 | 5.42 | 5.19 | 1.97 | 1.06 | 380 |
| Discharged gas | 30 | 120 | 0.22 | 0.29 | 0.17 | 0.11 | 1383 |

Set the condensing temperature to be −50° C.; Adopt organic permselective membrane (PDMS tubular membrane); set the absolute pressure of the vacuum pump on the permeation side to be 10 kPa. The result of experiment is as below:

|  | Temperature °C. | Pressure kPa | Butanone g/m³ | Ethyl acetate g/m³ | N-propyl acetate g/m³ | Methyl ether g/m³ | Air g/m³ |
|---|---|---|---|---|---|---|---|
| Gas inlet | 100 | Atmospheric pressure | 2.54 | 2.54 | 2.54 | 0.40 | 1160 |
| Condenser | −50 | Atmospheric pressure | 1.26 | 1.27 | 0.52 | 0.30 | 1200 |
| Permeate gas | 30 | 10 | 5.42 | 5.19 | 1.96 | 1.06 | 380 |
| Discharged gas | 30 | 120 | 0.22 | 0.29 | 0.16 | 0.11 | 1405 |

Seen from the above three experiments, the recycle of volatile organic compounds increases as the condensing temperature decreases, but not obviously, which means a vapor-liquid equilibrium is achieved at −30~−50° C., so the preferred condensing temperature is −30~−50° C.

Embodiment 2

Set the condensing temperature to be −30° C.; Adopt organic permselective membrane (PDMS tubular membrane); set the absolute pressure of the vacuum pump on the permeation side to be 20 kPa. The result of experiment is as below:

|  | Temperature °C. | Pressure kPa | Butanone g/m³ | Ethyl acetate g/m³ | N-propyl acetate g/m³ | Methyl ether g/m³ | Air g/m³ |
|---|---|---|---|---|---|---|---|
| Gas inlet | 100 | Atmospheric pressure | 2.54 | 2.54 | 2.54 | 0.40 | 1160 |
| Condenser | −30 | Atmospheric pressure | 1.27 | 1.29 | 0.54 | 0.30 | 1200 |
| Permeate gas | 30 | 20 | 5.35 | 5.21 | 1.9 | 1.06 | 500 |
| Discharged gas | 30 | 120 | 0.25 | 0.31 | 0.20 | 0.11 | 1375 |

Set the condensing temperature to be −30° C.; Adopt organic permselective membrane (PDMS tubular membrane); set the absolute pressure of the vacuum pump on the permeation side to be 40 kPa. The result of experiment is as below:

|  | Temperature °C. | Pressure kPa | Butanone g/m³ | Ethyl acetate g/m³ | N-propyl acetate g/m³ | Methyl ether g/m³ | Air g/m³ |
|---|---|---|---|---|---|---|---|
| Gas inlet | 100 | Atmospheric pressure | 2.54 | 2.54 | 2.54 | 0.40 | 1160 |
| Condenser | −30 | Atmospheric pressure | 1.27 | 1.29 | 0.54 | 0.30 | 1200 |
| Permeate gas | 30 | 40 | 5.27 | 5.17 | 1.70 | 1.02 | 520 |
| Discharged gas | 30 | 120 | 0.27 | 0.32 | 0.25 | 0.12 | 1370 |

Seen from the above two experiments, under a certain condensing temperature, the recycling rate of volatile organic compounds is relatively high when the vacuum pressure on the permeation side is 10 KPa-40 KPa.

Embodiment 3

Set the condensing temperature to be −30° C.; Adopt organic permselective membrane (PDMS coiled type composite membrane); set the absolute pressure of the vacuum pump on the permeation side to be 20 kPa. The result of experiment is as below:

| | Temperature ° C. | Pressure kPa | Butanone $g/m^3$ | Ethyl acetate $g/m^3$ | N-propyl acetate $g/m^3$ | Methyl ether $g/m^3$ | Air $g/m^3$ |
|---|---|---|---|---|---|---|---|
| Gas inlet | 100 | Atmospheric pressure | 2.54 | 2.54 | 2.54 | 0.40 | 1160 |
| Condenser | −30 | Atmospheric pressure | 1.27 | 1.29 | 0.54 | 0.30 | 1200 |
| Permeate gas | 30 | 20 | 5.34 | 5.22 | 2.00 | 1.06 | 510 |
| Discharged gas | 30 | 120 | 0.25 | 0.28 | 0.18 | 0.11 | 1373 |

Embodiment 4

Set the condensing temperature to be −30° C.; Adopt organic permselective membrane (PDMS organic membrane); set the absolute pressure of the vacuum pump on the permeation side to be 20 kPa. The result of experiment is as below:

| | Temperature ° C. | Pressure kPa | Butanone $g/m^3$ | Ethyl acetate $g/m^3$ | N-propyl acetate $g/m^3$ | Methyl ether $g/m^3$ | Air $g/m^3$ |
|---|---|---|---|---|---|---|---|
| Gas inlet | 100 | Atmospheric pressure | 2.54 | 2.54 | 2.54 | 0.40 | 1160 |
| Condenser | −30 | Atmospheric pressure | 1.27 | 1.29 | 0.54 | 0.30 | 1200 |
| Permeate gas | 30 | 20 | 5.33 | 5.23 | 2.02 | 1.02 | 490 |
| Discharged gas | 30 | 120 | 0.24 | 0.30 | 0.17 | 0.12 | 1378 |

Embodiment 5

Set the condensing temperature to be −30° C.; Adopt organic permselective membrane (PDMS mixed matrix membrane); set the absolute pressure of the vacuum pump on the permeation side to be 20 kPa. The result of experiment is as below:

| | Temperature ° C. | Pressure kPa | Butanone $g/m^3$ | Ethyl acetate $g/m^3$ | N-propyl acetate $g/m^3$ | Methyl ether $g/m^3$ | Air $g/m^3$ |
|---|---|---|---|---|---|---|---|
| Gas inlet | 100 | Atmospheric pressure | 2.54 | 2.54 | 2.54 | 0.40 | 1160 |
| Condenser | −30 | Atmospheric pressure | 1.27 | 1.29 | 0.54 | 0.30 | 1200 |
| Permeate gas | 30 | 20 | 5.51 | 5.33 | 2.10 | 1.04 | 512 |
| Discharged gas | 30 | 120 | 0.21 | 0.28 | 0.15 | 0.11 | 1372 |

Seen from Embodiments 1-5 and data analysis, when the condensing temperature is set to be −30~−50° C., the organic permselective membrane is adopted, and the absolute pressure of the vacuum pump on the permeation side is set to be 10-40 KPa, recycling rate of the technique may reach 90%, and the content of organic compounds in tail gas emission is no more than 1 $g/m^3$ according to experiments and on-line chromatographic analysis.

The schemes in the above embodiments may be further combined or replaced, and the above embodiments only relates to description of preferred embodiments of the present invention rather than restriction of concept and scope of the present invention. Various changes and improvements of the technical schemes of the present invention made by technicians in this field are within the scope of protection of the present invention provided that such changes and improvements are within the design concept of the present invention.

What is claimed is:
1. A method for recycling volatile organic compounds of coating printing industry, comprising following steps:

(1) collecting a mixed gas of volatile organic compounds comprising hydrocarbons, alcohols, esters, ethers and nitriles produced in a printing process of the coating machine, which evaporates at least 85% of coating liquids it consumes, with a collecting hood of coating machine, precooling the mixed gas to 0° C. and compressing and leading the mixed gas into a condensation system for condensation at −30~−50 to obtain a condensate; and (2) leading the condensate obtained in the above step into a gas-liquid separator to obtain a liquid of coating solvent with high concentration after an enrichment process, of which a measurement is taken, and a non-condensable gas; and leading the non-condensable gas into a membrane separation using a PDMS composite membrane and enrichment system to obtain a mixed gas of organic compounds which is sent back to the compressor through a vacuum pump for recycling.

2. The method as claimed in claim 1, wherein in Step 2, after measurement, the coating solvent with high concentration enters a solvent preparation area of an appointed workshop section for recycling uses according to the measurement.

3. The method technique as claimed in claim 1, wherein in Step 2, the absolute pressure of the vacuum pump on the permeation side during operation of the complete set of membrane assembly is 10~40 kPa.

4. The method technique as claimed in claim 1, wherein the PDMS composite membrane is an organophilic composite membrane where modified polydimethyl siloxane is coated on and crosslinked with an inorganic ceramic tubular membrane or a PVDF matrix membrane.

\* \* \* \* \*